Patented May 30, 1933

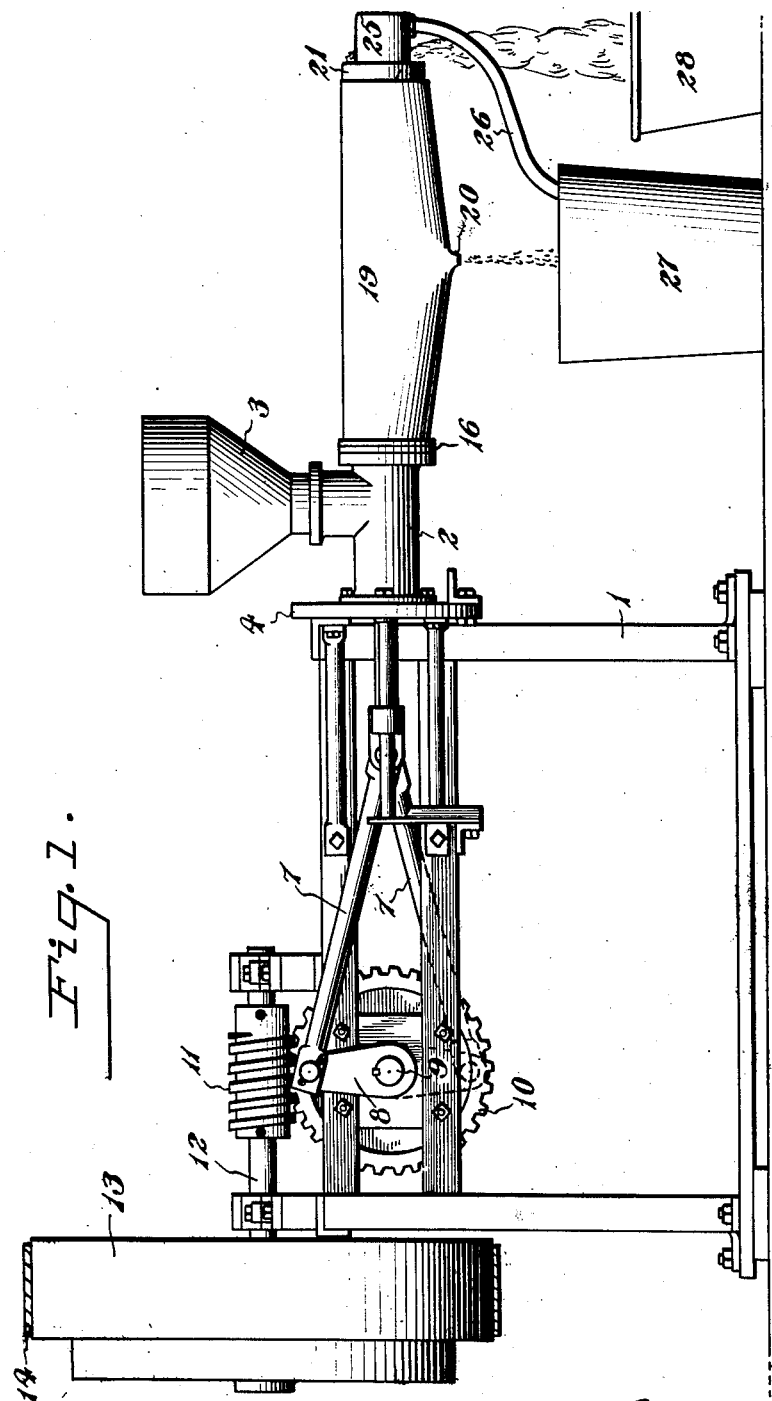

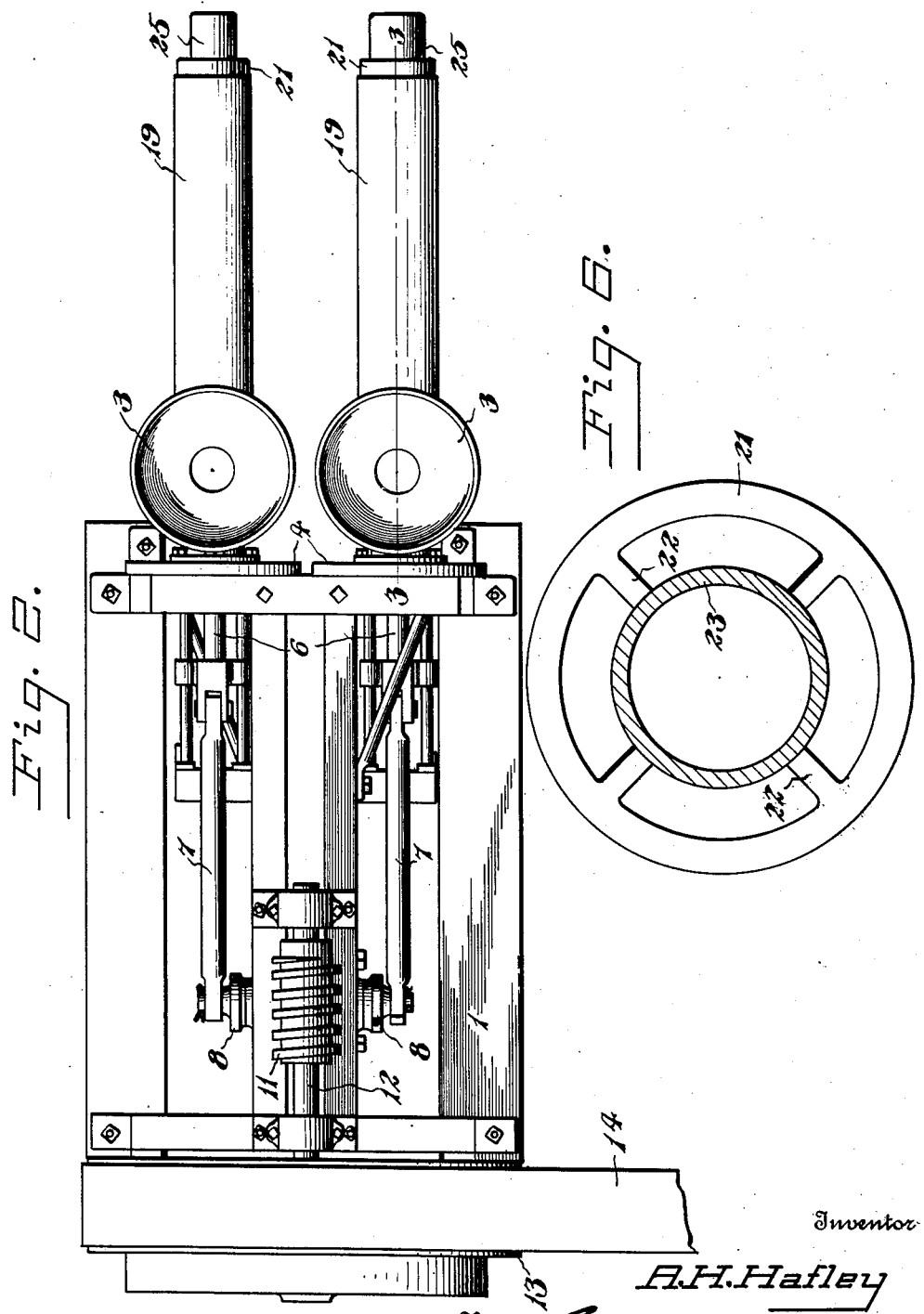

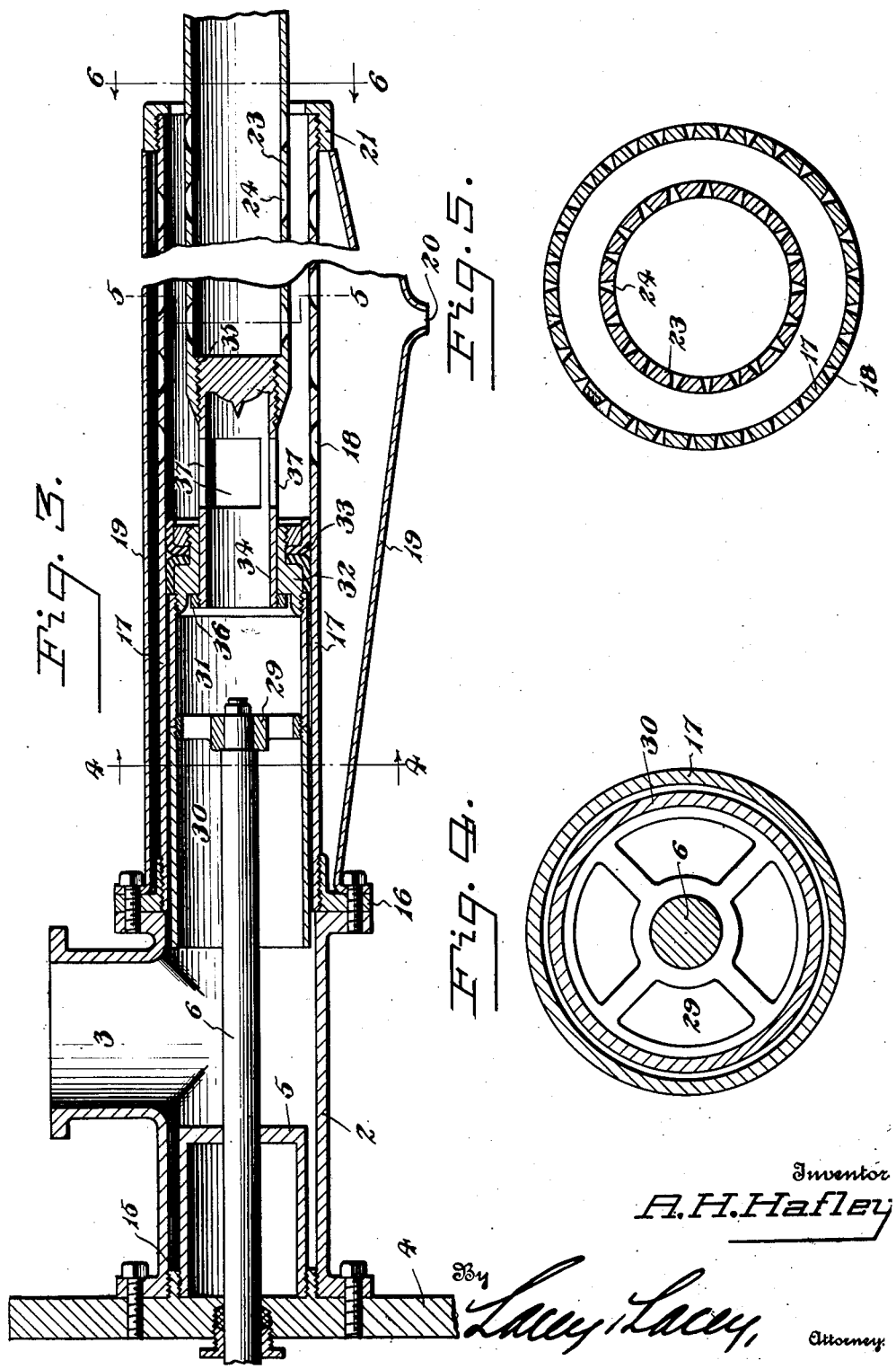

1,911,687

UNITED STATES PATENT OFFICE

ADAM H. HAFLEY, OF ASHLEY, ILLINOIS

FRUIT PRESS

Application filed June 11, 1931. Serial No. 543,683.

This invention relates to presses for extracting juice and has for its object the provision of a durable and efficient machine whereby juices of fruits or vegetables will be extracted and the pulp and juice separately delivered into suitable receptacles. The invention is illustrated in the accompanying drawings and will be hereinafter fully set forth and particularly defined.

In the drawings,

Figure 1 is a side elevation of a machine embodying the invention,

Fig. 2 is a top plan view of the same,

Fig. 3 is an enlarged longitudinal section on the line 3—3 of Fig. 2,

Fig. 4 is an enlarged detail transverse section on the line 4—4 of Fig. 3,

Fig. 5 is a transverse section on the line 5—5 of Fig. 3, and

Fig. 6 is a transverse section on the line 6—6 of Fig. 3.

The apparatus of my invention comprises a hopper, a cylinder, and a plunger and delivery tubes working within the cylinder and acting upon the fruits or vegetables deposited in the hopper in such a manner that the fruits or vegetables will be compressed so that the juices will be extracted and the pulp delivered at the end of the cylinder. Preferably, the cylinder, hopper and operating parts are provided in duplicate, with the plungers working in alternation, so that the delivery of juices may be continuous. The cylinders and cooperating parts are duplicates and a description of one will suffice for both.

In carrying out the invention, there is provided a supporting frame 1 which may be of any approved form having the requisite strength and rigidity. Supported by and extending from one end of the frame are relatively short cylinders 2 having hoppers 3 mounted on their upper sides near their ends remote from the supporting frame and in communication with the cylinders. The cylinders are secured directly to face plates 4 which are rigid upon the frame, and disposed concentrically within the cylinders, against the face plates, are rams or abutments 5 against which the vegetables or fruits are compressed in the operation of the machine, each abutment being spaced from the inner wall of the adjacent cylinder to form an annular chamber. Mounted slidably through the ram or abutment 5 is a piston rod 6 which extends through the face plate 4 and is pivoted to a pitman 7, as will be understood upon reference to Figs. 1 and 2. The outer ends of the pitmen 7 are pivoted to cranks 8 provided on the ends of a shaft 9 which is mounted in any convenient manner upon the supporting frame and is equipped between its ends with a worm gear 10 meshing with a worm 11 on an upper driving shaft 12 which is also suitably journaled in bearings upon the supporting frame and projects beyond the end of the frame where it is equipped with a driving pulley 13 to which motion may be imparted from any prime motor through a belt 14 in a well-understood manner. The cranks 8 project in opposite directions from the shaft 9 so that the pitmen and the plungers respectively connected therewith work alternately.

The abutment 5 is in the form of a cylindrical hollow block threaded into a spacing collar 15 which in turn is threaded into the end of the cylinder 2, whereby the abutment is secured within the cylinder and is maintained in spaced relation thereto. Secured to the outer end of the cylinder 2 is a coupling collar 16, and threaded into said collar is an outer cylinder or tube 17, the outer end portion of which is provided with outlet openings 18 which, as shown in Fig. 5, flare outwardly so that the juices may readily escape, but the pulp will not pass through said openings but will be retained within the tube. An outer casing 19 is bolted at one end to the coupling collar 16 and extends around the tube 17, the lower portion of this casing being provided with a discharge opening 20, and the under side of the casing being suitably shaped to direct the juices to said opening. Abutting the outer end of the casing 19, a collar 21 is threaded onto the outer end of the tube 17, and this collar is provided at its inner circumference with inwardly extending radial lugs 22 which abut an inner sleeve or tube 23. Said inner tube 23 is provided with openings 24 therethrough, and said openings flare inwardly so that, while juices may flow through the openings into the tube, the pulp caught between the tubes 17 and 23 will be prevented from passing through the openings and will be discharged through the spaces defined by the inner tube 23, the collar or ring 21 and the lugs 22, said lugs 22 serving to maintain the concentric spaced relation of the tubes. The openings 24 through the wall of the tube 23 are provided in the inner end portion of said tube, while the outer end portion 25 of the tube is imperforate but has a hose 26 attached to its under side and leading to a receptacle 27 disposed under the outlet 20 of the tube 19, as clearly shown in Fig. 1. The pulp, as has been stated, is discharged through the ring 21 and may be caught in a receptacle 28 placed therebelow. The piston rod 6 may extend outwardly beyond the hopper 3, as shown in Fig. 3, and upon its extremity is secured a spider 29, the external periphery of the spider being threaded and engaged with corresponding threaded surfaces of tubes 30 and 31 which constitute a scoop and plunger to cooperate with the abutment or ram 5 for compressing the fruits or vegetables and extracting the juices therefrom. The tube 30 is open-ended and of such diameter that it will fit snugly within the annular chamber between the cylinder 2 and the abutment 5, and, consequently, any fruits or vegetables which may have been fed through the hopper 3 will be caught within the scoop or tube and thoroughly compressed between the abutment and the spider, the pressure being sufficient to force the material through the spider into the tube 31. The outer end of the tube 31 has a piston or plunger head 32 secured thereon, and this piston or plunger head is equipped with washers or packing 33 whereby a close running fit within the tube 17 is provided and leakage of the juices is prevented. Extending through the plunger or piston head 32 is a valve tube 34 which has its outer end closed and threaded into the inner end of the delivery tube 23, as shown at 35 in Fig. 3. At its inner end, the valve tube 34 is equipped with a stop collar 36 adapted to abut the inner side of the plunger or piston head, as clearly shown in Fig. 3, so that on one stroke of the plunger the tube will be caused to move therewith and, on the opposite stroke of the plunger, the plunger may slide along the tube and close or partly close the openings 37 formed therethrough. The tube 23 is obviously of greater diameter than the tube 34, and, upon the outward stroke of the plunger, the inner end of the tube 23 will eventually be engaged, and thereupon the movement of the plunger will be imparted to said tube.

From the foregoing description, taken in connection with the accompanying drawings, it is thought the operation and advantages of the apparatus will be readily understood. As has been stated, the fruits or vegetables from which juices are to be extracted are placed in the hoppers 3 and the driving mechanism is then set in motion. The plunger will reciprocate within the tube 17, which is stationary, and, upon the inward stroke of the plunger, the tubes 30 and 31 will move inwardly therewith and the plunger will move along the tube 34 until the stop collar 36 is engaged, whereupon said tube 34 will move inwardly with the plunger. During the inward stroke, all the fruits or vegetables below the top of the scoop tube 30 will be caught within the scoop and will be confined between the scoop, the abutment and the spider 29, so that, as the stroke of the plunger continues, the fruits or vegetables will be compressed between the spider and the abutment or ram and will be forced through the open spaces of the spider into the tube 31. Eventually, the pulp and juices will be forced into the valve tube 34 and through the openings 37 into the space between the tubes 17 and 23, as will be understood. Inasmuch as the cross sectional area, and consequently the capacity of the space between the tubes 17 and 23, is much less than the cross sectional area of the tube 31, in actual practice being about one-half, it is evident that the pulp will be very firmly compressed within said contracted space and the juices, therefore, will flow through the openings 18 and 24 into the respective tubes and thence escape to the receptacle 27. When the plunger makes its outward stroke, the material in front thereof will, of course, be forced into the space between the tubes 17 and 23 and thereby very firmly compressed, and it will be noted that, on this outward stroke, the plunger will ride along the tube 34 and will pass over the openings 37, so that it will cut off further flow into the tube 17 and will engage the inner end of the tube 23 so as to impart an outward movement thereto and set the tube 34 so that the openings 37 will be uncovered on the ensuing instroke of the plunger. The proportions of the parts are such that at no time will the outward stroke of the tube 23 carry the openings 24 beyond the end collar or ring 21, and, consequently, the juices forced into the tube 23 will not be permitted to escape with the pulp but will be carried to the closed outer end of the tube and then discharged through the hose 26. As the plunger and the parts connected therewith move inwardly, the juices and pulp will be caused to pass through the openings 37, but flow through the openings 37 will be prevented on the outward stroke of the plunger and the force of the plunger will be applied against the pulp and juices between the tubes 17 and 23 so that the pulp will be compressed to a very high degree and the juices forced therefrom. Of course, when the plunger makes its outward stroke, a fresh supply of material will gravitate through the hopper to the bottom thereof in position to be acted upon by the plunger piston or spider upon its ensuing inward stroke. The machine is very compact in construction and simple in the arrangement of its parts, so that it will operate very efficiently and is not apt to get out of order.

Having thus described the invention, I claim:

1. A press comprising a hopper, a stationary ram mounted in the bottom of the hopper at one side of the mouth of the hopper, a tubular scoop mounted at the opposite side of the mouth of the hopper and adapted to fit around the ram to enclose material fed to the bottom of the hopper, a spider secured within the tubular scoop, means connected with the spider for reciprocating the same and the scoop, a plunger attached to the end of the scoop beyond the spider, a tube surrounding the plunger and provided with discharge openings through its wall, and means cooperating with the plunger whereby material forced through the spider will be compressed within said tube and the juices expelled through the openings therein.

2. A press comprising an outer casing having a discharge opening in its bottom, a stationary tube within the casing having escape openings through its outer end portion communicating with the casing and having its outer end open, an inner tube movable axially of the stationary tube and provided with escape openings in its inner end portion, the outer end portion of said inner tube being imperforate for the greater portion of the length of the tube, a discharge element at the outer end of said inner tube, and means within the stationary tube for imparting endwise movement to the inner tube and compressing material between the two tubes whereby juices will be forced through the openings in the tubes and solid matter will be discharged through the open end of the stationary tube, the escape openings in the inner tube being always within the extent of the stationary tube.

3. A press comprising an outer tube having escape openings through its outer end portion, a plunger mounted in said tube, an inner tube disposed concentrically within the outer tube and having escape openings through its inner end portion, a valve sleeve coupled to the inner end of said inner tube and slidably fitted through the plunger and having openings through its wall adjacent the inner end of the inner tube, and a stop collar on said valve tube to be engaged by the inner face of the plunger whereby the plunger will have lost motion connection with the valve tube.

4. A press comprising a cylinder, a hopper thereon, a stationary imperforate ram secured in one end of the cylinder and projecting toward and terminating at one side of the hopper, said ram being spaced from the inner wall of the cylinder to form an annular chamber, a cylindrical scoop slidably mounted in the cylinder, a spider secured in the scoop, and means for reciprocating the spider and the scoop whereby the scoop will enter the annular chamber surrounding the ram and material fed through the hopper will be enclosed by the scoop and compressed between the ram and the spider and forced through the spider.

5. A press comprising a cylinder, a hopper on the cylinder between the ends thereof, a ram secured in one end of the cylinder in spaced concentric relation thereto and having its free end at one side of the hopper, a cylindrical scoop slidably mounted in the cylinder and alined axially with the ram, a spider secured in the scoop, the scoop extending beyond the spider, means connected with the spider for reciprocating the same and the scoop whereby the scoop will be caused to encircle the ram and material from the hopper will be compressed in the scoop and expressed through the spider, a plunger at the end of the scoop beyond the spider, a stationary tube secured to and extending axially from the cylinder and provided with escape openings for juices in its sides, a valve tube extending through and having lost motion connection with the plunger and having openings in its sides to establish or cut off flow from the scoop, and a tube alined axially with and secured to the valve tube and closed at one end thereby, said tube being concentric with the stationary tube and open at its outer end and provided in its inner end portion with openings for the passage of juice.

6. A press comprising a stationary tube having escape openings in its outer end portion, an inner tube concentric with the stationary tube and having openings through its inner end portion, the outer ends of both tubes being open, a plunger working in the stationary tube, a valve tube having openings through its sides and having its inner end open and its outer end secured to and closing the inner end of the inner tube, said valve tube extending slidably through and having lost motion connection with the plunger whereby its openings will at times cut off flow and at times will establish flow to the stationary tube, the plunger forcing material into compression between the stationary tube and the inner tube, and means whereby during movement of the plunger and the valve tube material will be compressed and driven into the valve tube.

7. A press comprising a cylinder, a hopper thereon, a stationary tube at one end of the cylinder and at one side of the hopper, a stationary ram secured in one end of the cylinder and disposed concentric with and spaced from said cylinder, a cylindrical open-ended scoop mounted at the opposite side of the hopper, means for moving the scoop toward and from the ram whereby to encircle the ram and enclose and compress material fed to the bottom of the hopper, and means for removing the compressed material from the scoop through the end thereof remote from the ram and separating the juices from said material.

In testimony whereof I affix my signature.

ADAM H. HAFLEY. [L. S.]